(12) United States Patent
Oh et al.

(10) Patent No.: US 7,474,501 B2
(45) Date of Patent: Jan. 6, 2009

(54) OUTER HUB ASSEMBLY AND SPINDLE MOTOR INCLUDING THE SAME IN HARD DISK DRIVE AND METHOD FOR SERVO-TRACK WRITING

(75) Inventors: Dong-ho Oh, Seoul (KR); Ja-choon Koo, Seoul (KR); Yong-kyu Byun, Yongin-si (KR); Jae-hyuk Han, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 370 days.

(21) Appl. No.: 11/159,215

(22) Filed: Jun. 23, 2005

(65) Prior Publication Data

US 2005/0286164 A1 Dec. 29, 2005

(30) Foreign Application Priority Data

Jun. 29, 2004 (KR) ............... 10-2004-0049747

(51) Int. Cl.
*G11B 17/038* (2006.01)
*G11B 25/04* (2006.01)

(52) U.S. Cl. ............ 360/98.07; 360/98.08; 360/99.08; 360/99.12

(58) Field of Classification Search .......... 360/98.08, 360/98.07, 99.04, 99.05, 99.08, 99.12
See application file for complete search history.

(56) References Cited

U.S. PATENT DOCUMENTS

| | | | | |
|---|---|---|---|---|
| 3,509,992 A | * | 5/1970 | Stuart-Williams et al. | 206/308.3 |
| 3,902,195 A | * | 8/1975 | Osako et al. | 360/133 |
| 4,065,799 A | * | 12/1977 | Kaczeus | 360/135 |
| 4,224,648 A | * | 9/1980 | Roling | 360/99.12 |
| 4,391,543 A | * | 7/1983 | Elsing | 403/24 |
| 4,412,261 A | * | 10/1983 | Tateyama et al. | 360/97.03 |
| 5,160,865 A | * | 11/1992 | Gururangan | 310/67 R |
| 5,459,627 A | * | 10/1995 | Peter | 360/98.08 |
| 5,894,374 A | * | 4/1999 | Moraru | 360/75 |
| 6,282,053 B1 | * | 8/2001 | MacLeod et al. | 360/98.07 |
| 6,307,706 B1 | * | 10/2001 | Krum et al. | 360/98.08 |
| 7,114,244 B2 | * | 10/2006 | Yeom et al. | 29/737 |

FOREIGN PATENT DOCUMENTS

| | | | |
|---|---|---|---|
| JP | 5-325366 A | | 12/1993 |
| JP | 9-219059 A | | 8/1997 |
| JP | 2004-79025 A | | 3/2004 |
| JP | 2004241042 A | * | 8/2004 |
| KR | 1998-0011385 A | | 4/1998 |

* cited by examiner

*Primary Examiner*—William J Klimowicz
(74) *Attorney, Agent, or Firm*—Sughrue Mion, PLLC (57) ABSTRACT

A spindle motor, which rotates a plurality of data storage disks in a hard disk drive, the spindle motor including: a shaft; an inner hub rotatably installed on an outer periphery of the shaft; and a hub assembly, which includes: an outer hub detachably coupled to an outer periphery of the inner hub, the outer hub shaped such that a plurality of disks and at least one spacer for maintaining an interval between adjacent disks of the plurality of disks can be secured to an outer periphery of the outer hub; and a fastening member coupled to a top portion of the outer hub and fixing the outer hub to the inner hub. The outer hub assembly to which the plurality of disks are secured can be mounted on an off-line servo-track writer, and can also be attached as is to the spindle motor after servo-track writing is completed.

32 Claims, 11 Drawing Sheets

OUTER HUB ASSEMBLY AND SPINDLE MOTOR INCLUDING THE SAME IN HARD DISK DRIVE AND METHOD FOR SERVO-TRACK WRITING

CROSS-REFERENCE RELATED TO APPLICATION

This application claims the priority of Korean Patent Application No. 10-2004-0049747, filed on Jun. 29, 2004, in the Korean Intellectual Property Office, the disclosure of which is incorporated herein in its entirety by reference.

BACKGROUND OF THE INVENTION

1. Field of the Invention

The present invention relates to a hard disk drive (HDD) and, more particularly, to a hub assembly mountable on an off-line servo-track writer as well as on a spindle motor, a spindle motor including the hub assembly, and a method for servo-track writing.

2. Description of the Related Art

Hard disk drives (HDDs), which store information in computers, reproduce or record data on a rotating disk using a read/write head. In the HDDs, the read/write head functions by being moved to a desired position by an actuator while being lifted above a recording surface of the rotating disk at a predetermined height.

Figure 1:
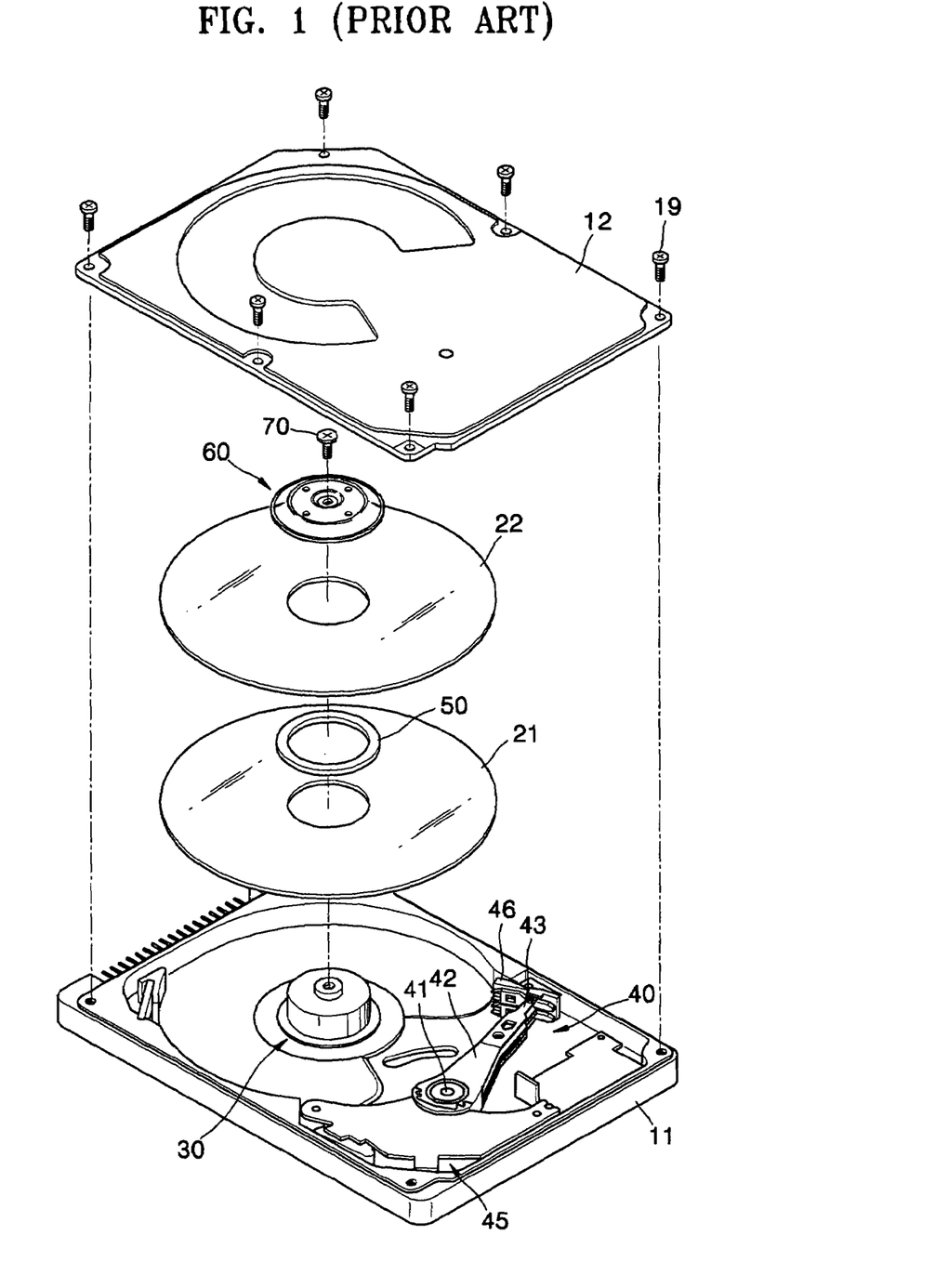
FIG. 1 is an exploded perspective view of a conventional hard disk drive (HDD)

FIG. 1 is an exploded perspective view of a conventional HDD.

Referring to FIG. 1, a base member 11 of the HDD supports a spindle motor 30 for rotating disks 21 and 22 that are data recording media, and an actuator 40 for moving a read/write head for reproducing and recording data at a desired position on the disks 21 and 22.

The spindle motor 30 is installed on the base member 11. The two disks 21 and 22 may be mounted on the spindle motor 30 as shown in FIG. 1, and one, or three or more disks may also be mounted. If the plurality of disks 21 and 22 are mounted on the spindle motor 30, a ring-shaped spacer 50 is interposed between the disks 21 and 22 to maintain an interval between the disks 21 and 22. A clamp 60 is coupled to a top portion of the spindle motor 30 using a screw 70 to firmly fix the disks 21 and 22 to the spindle motor 30.

The actuator 40 includes a swing arm 42 rotatably coupled to a pivot 41 installed on the base member 11, a suspension 43 installed on an end of the swing arm 42 and adapted to elastically bias a slider on which the read/write head is mounted toward a surface of one of the disks 21 and 22, and a voice coil motor (VCM) 45 for rotating the swing arm 42. The VCM 45 is controlled by a servo control system, and rotates the swing arm 42 in a direction according to Fleming's Left Hand Rule due to an interaction between current input to a VCM coil and a magnetic field formed by magnets. That is, if the HDD is turned on and the disks 21 and 22 begin to rotate, the VCM 45 rotates the swing arm 42 counterclockwise to move the read/write head over a recording surface of the respective disks 21 and 22. On the other hand, if the HDD is turned off and the disks 21 and 22 stop rotating, the VCM 45 rotates the swing arm 42 clockwise to remove the read/write head from the recording surface of one of the disks 21 and 22. At this time, the read/write head removed from the recording surface of the respective disks 21 and 22 is parked on a ramp 46 disposed outside the disks 21 and 22.

A cover member 12 is attached to an upper portion of the base member 11 using a plurality of screws 19. The base member 11 and cover member 12 enclose and protect the disks 21 and 22, the spindle motor 30, and the actuator 40.

The structure where the spindle motor 30, the disks 21 and 22, the spacer 50, and the clamp 60 are coupled to one another will now be explained in further detail with reference to FIG. 2.

Figure 2:
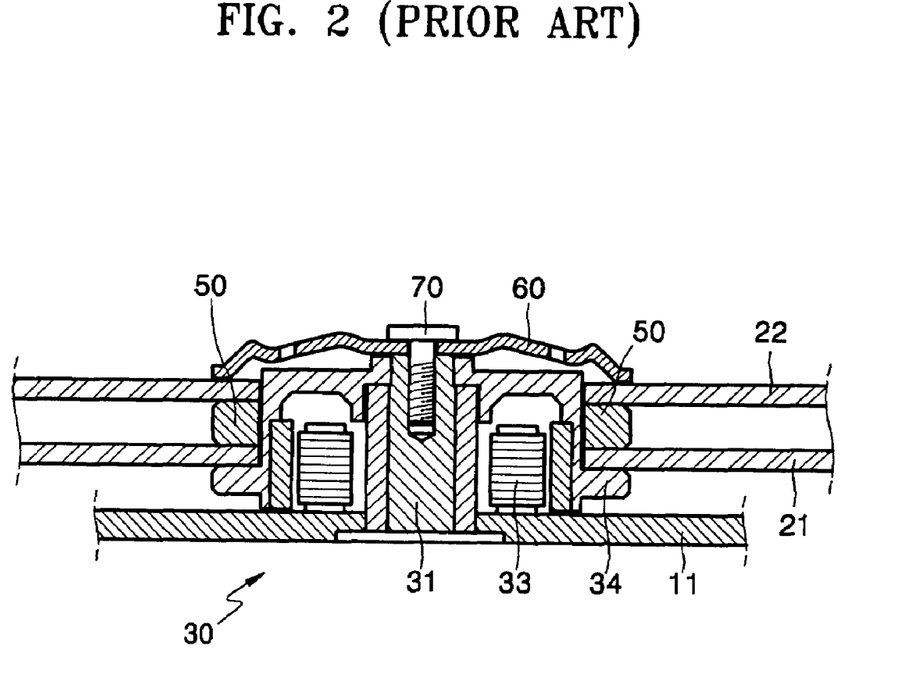
FIG. 2 is a vertical sectional view of the HDD shown in FIG. 1 in which a spindle motor, disks, a spacer, and a clamp are coupled to one another.

Referring to FIG. 2, the spindle motor 30 includes a shaft 31 rotatably supported on the base member 11, and a stator 33 and a rotator 34 placed around the shaft 31. The rotator 34 is referred to as a hub. The data storage disks 21 and 22 are fitted to an outer periphery of the hub 34. As mentioned above, if the plurality of disks 21 and 22 are mounted on the spindle motor 30, the ring-shaped spacer 50 for maintaining an interval between the disks 21 and 22 is attached to the outer periphery of the hub 34 and interposed between the disks 21 and 22. The clamp 60 for fixing the disks 21 and 22 is coupled to a top portion of the shaft 31 using the screw 70.

In the spindle motor 30, the hub 34 rotates together with the shaft 31, and, accordingly, rotates the disks 21 and 22.

Although not shown, a shaft of the spindle motor 30 may be fixed to the base member 11. In this case, the hub 34 is rotatably coupled to the outer periphery of the fixed shaft.

In the HDD constructed as above, servo-track information is written in advance on the surfaces of the disks 21 and 22 so that the read/write head can be moved to a desired position on one of the disks 21 and 22 in a faster and more exact manner. The process of writing the servo-track information in advance is referred to as servo-track writing. The servo-track writing is typically performed after the HDD is completely assembled. That is, after the disks 21 and 22 are mounted on the spindle motor 30, servo-track information is written to the rotating disks 21 and 22 using a clock head of a servo-track writer.

However, such a servo-track writing method requires much time. In particular, the data storage capacity of a magnetic disk in a HDD has increased remarkably in recent years. Accordingly, the number of tracks on the disk increases, thereby lengthening a time required for servo-track writing and increasing production costs.

In order to solve those problems, an off-line servo-track writing method has been used recently. In this method, a plurality of disks are mounted on a separate off-line servo-track writer (OSTW) before mounting the plurality of disks on a spindle motor so that servo-track writing can be performed on the plurality of disks at once.

However, in such an off-line servo-track writing method, since the plurality of disks on which servo-track writing is completed should be individually mounted on a hub of the spindle motor, misalignment of the disks along their rotational axes and misalignment of the phases of the disks occur often and repeatable run-out (RRO) occurs on the disks during the operation of the HDD.

SUMMARY OF THE INVENTION

The present invention provides a hub assembly, which can be mounted on an off-line servo-track writer as well as on a spindle motor to minimize misalignment of rotational axes and phases of disks during off-line servo-track writing.

The present invention also provides a spindle motor including the hub assembly used in a hard disk drive (HDD).

The present invention also provides a method of writing servo-track information using the hub assembly.

According to an aspect of the present invention, there is provided an outer hub assembly, which can, for example, be selectively mounted on a spindle motor having an inner hub in a hard disk drive or on an off-line servo-track writer having a motor shaft. The outer hub assembly comprises: an outer hub detachably coupled to an outer periphery of the inner hub or to an outer periphery of the motor shaft, the outer hub shaped such that a plurality of disks and at least one spacer for maintaining an interval between adjacent disks among the plurality of disks can be fitted to an outer periphery of the outer hub; and a fastening member coupled to a top portion of the outer hub and fixing the outer hub to the inner hub or the motor shaft.

The outer hub may comprise a cylindrical body unit, a support unit disposed on a bottom portion of the body unit and supporting the plurality of disks, and a clamping unit disposed on a top portion of the body unit and clamping the plurality of disks.

The body unit may comprise an upper body and a lower body, the clamping unit may be integrated with a top portion of the upper body in the form of a flange, and the support unit may be integrated with a bottom portion of the lower body in the form of a flange.

In this case, a bottom portion of the upper body and a top portion of the lower body may have screw portions such that the screw portions can mesh with each other.

In the meantime, the clamping unit may be integrated with the top portion of the body unit in the form of a flange, and the support unit may be coupled as a separate ring-shaped member to the bottom portion of the body unit.

In this case, an inner surface of the support unit and the bottom portion of the body unit may have screw portions such that the screw portions can mesh with each other.

In the meantime, the clamping unit may be a separate ring-shaped member coupled to the top portion of the body unit, and the support unit may be integrated with a bottom portion of the support unit in the form of a flange.

In this case, an inner surface of the clamping unit and the top portion of the body unit may have screw portions such that the screw portions can mesh with each other.

A clamping washer may be interposed between the clamping unit and an uppermost disk among the plurality of disks to apply an elastic force to the plurality of disks.

A groove into which the fastening member is inserted may be formed on a top surface of the outer hub, at least one projection may be formed on an outer peripheral surface of the fastening member, and at least one slot into which the projection is inserted may be formed on an inner peripheral surface of the groove.

In the meanwhile, a groove into which the fastening member is inserted may be formed on a top surface of the outer hub, and the fastening member inserted into the groove may be screwed to the outer hub using a plurality of coupling screws.

The fastening member may be fixed to the inner hub or the motor shaft using a fastening screw that is fastened to a shaft of the spindle motor or to the motor shaft of the off-line servo-track writer.

Meanwhile, the fastening member may be fixed to the inner hub using a plurality of fixing screws that are fastened to the inner hub of the spindle motor, or fixed to the motor shaft using a fastening screw that is fastened to the motor shaft of the off-line servo-track writer.

A plurality of outer hub assemblies may be mounted on the motor shaft of the off-line servo-track writer.

Here, the motor shaft may comprise a larger diameter portion and a smaller diameter portion, the larger diameter portion may be inserted into an outer hub of one of the plurality of hub assemblies, and the smaller diameter portion may be inserted into an outer hub of at least another one of the plurality of outer hub assemblies.

In this case, a coupling member may be interposed between adjacent outer hub assemblies of the plurality of outer hub assemblies, and the coupling member may be fitted to an outer periphery of the smaller diameter portion of the motor shaft.

The coupling member may comprise: a hub insertion unit inserted into an outer hub of one of the plurality of outer hub assemblies; and a groove insertion unit formed on one surface of the hub insertion unit to be inserted into a groove formed on a top surface of an outer hub of another one of the plurality of outer hub assemblies.

In the meantime, the outer assembly may further comprise a plurality of pressure members installed on the motor shaft to correspond to the plurality of outer hub assemblies such that the plurality of pressure members can get into and out of the motor shaft, wherein the motor shaft has a cylindrical shape with a predetermined diameter In this instance, the plurality of pressure members may be projected outwardly from an outer peripheral surface of the motor shaft and forced to inner peripheral surfaces of the outer hub assemblies by pressure.

Further, the outer assembly may further comprise at least one projection installed on the motor shaft so that the projection can get into and out of the motor shaft, wherein the at least one projection is inserted into a slot formed on a top surface of an outer hub of a corresponding outer hub assembly.

According to another aspect of the present invention, there is provided a spindle motor, which rotates a plurality of data storage disks in a hard disk drive, the spindle motor comprising: a shaft; an inner hub rotatably installed on an outer periphery of the shaft; and a hub assembly comprising: an outer hub detachably coupled to an outer periphery of the inner hub, the outer hub shaped such that a plurality of disks and at least one spacer for maintaining an interval between adjacent disks of the plurality of disks can be secured to an outer periphery of the outer hub; and a fastening member coupled to a top portion of the outer hub and fixing the outer hub to the inner hub, wherein the hub assembly can be separated from the spindle motor to be mounted on an off-line servo-track writer.

According to still another aspect of the present invention, there is provided a method of writing servo-track information to a plurality of disks for a hard disk drive, the method comprising: preparing an outer hub assembly to which the plurality of disks are secured; mounting the outer hub assembly on an off-line servo-track writer and writing servo-track information to the plurality of disks; and separating the outer hub assembly from the off-line servo-track writer and attaching the outer hub assembly to a spindle motor of the hard disk drive.

BRIEF DESCRIPTION OF THE DRAWINGS

The above and other features and advantages of the present invention will become more apparent by describing in detail exemplary embodiments thereof with reference to the attached drawings, in which.

DETAILED DESCRIPTION OF THE ILLUSTRATIVE, NON-LIMITING EMBODIMENTS OF THE INVENTION

Exemplary embodiments of the present invention will now be described more fully with reference to the accompanying drawings. The described exemplary embodiments are intended to assist in the understanding of the invention and are not intended to limit the scope of the invention in any way. Like reference numerals refer to like elements throughout.

Figure 3:
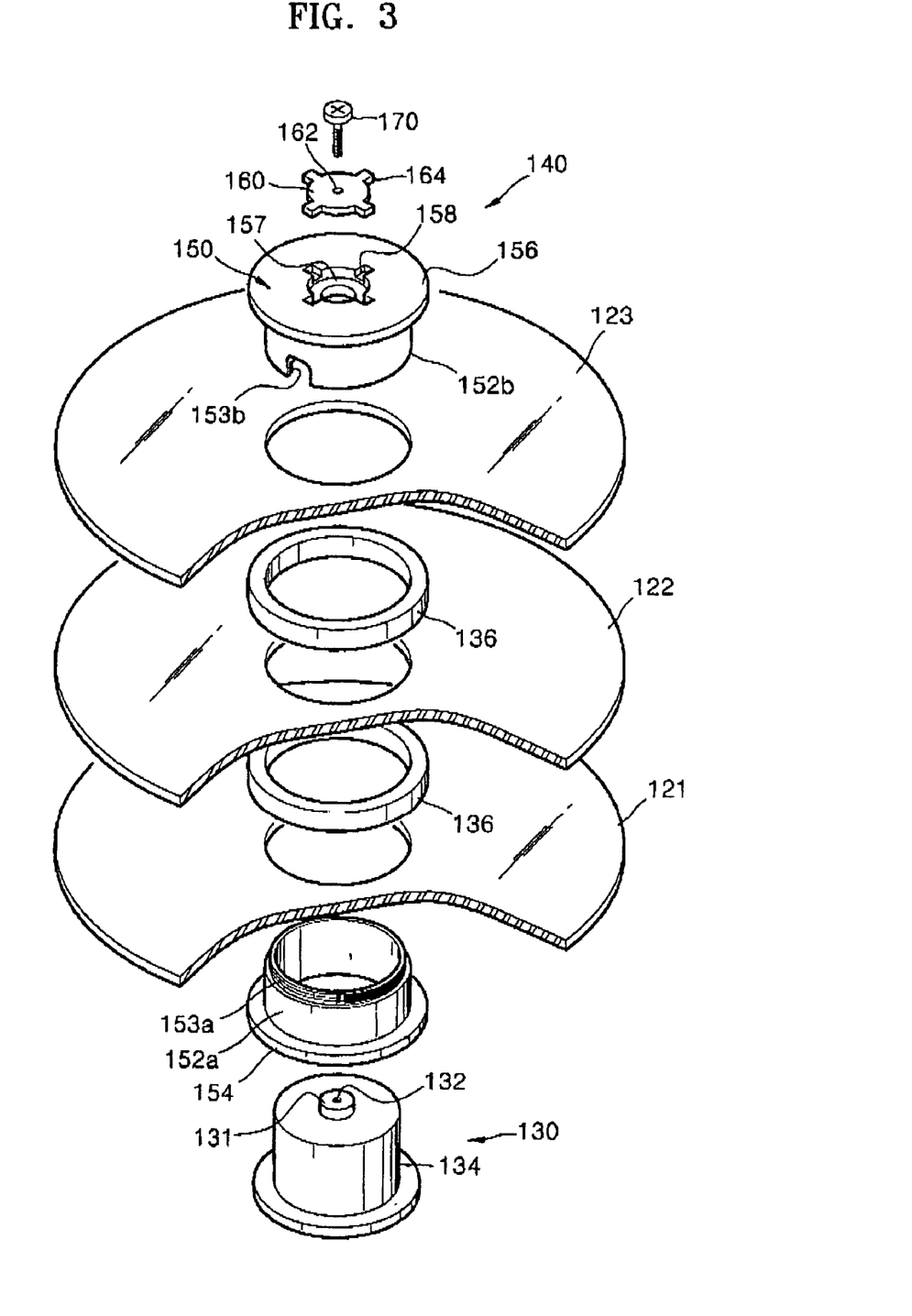
FIG. 3 is an exploded perspective view of an outer hub assembly of a spindle motor according to an exemplary embodiment of the present invention.
Figure 4:
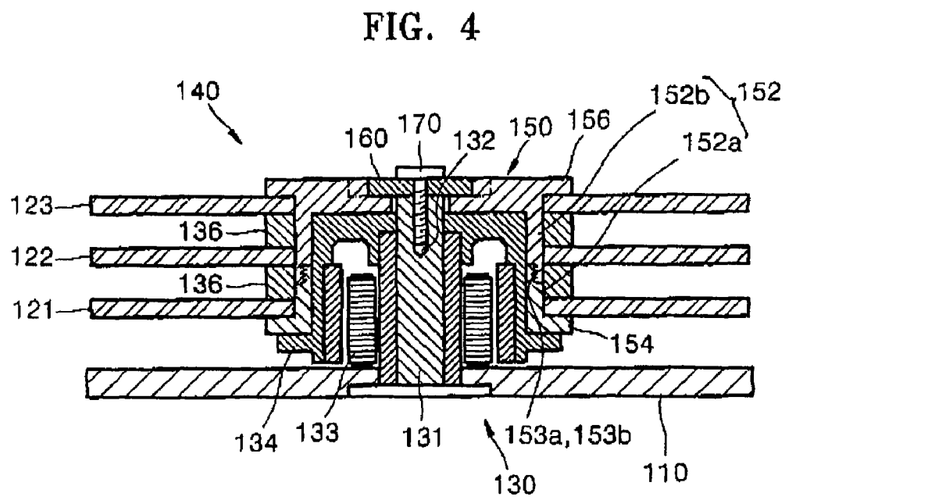
FIG. 4 is a vertical sectional view of the spindle motor shown in FIG. 3.
Figure 5:
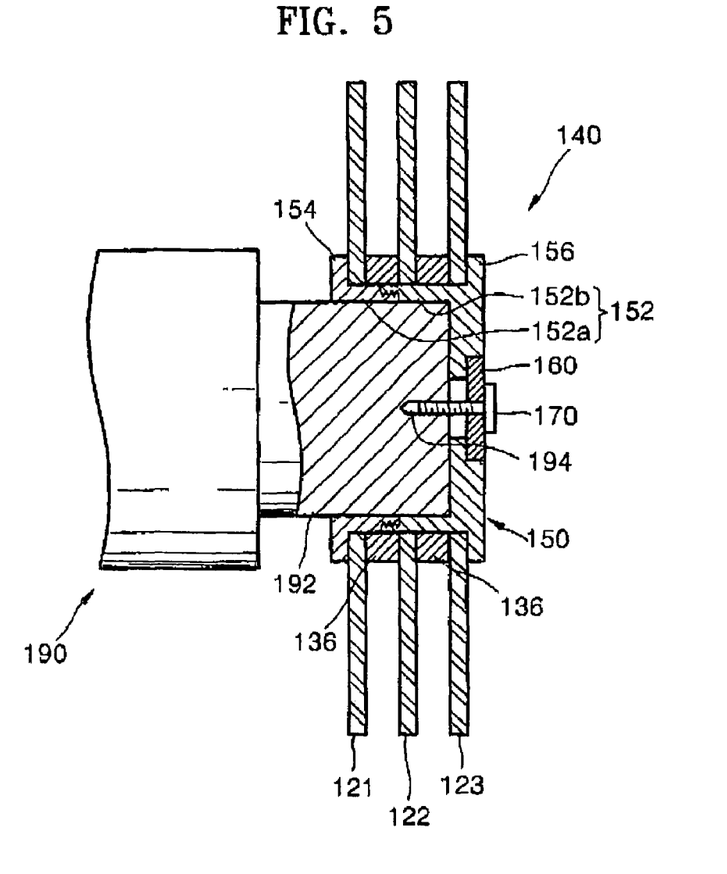
FIG. 5 is a partial sectional view illustrating a state in which the outer hub assembly shown in FIG. 3 is mounted on an off-line servo-track writer.

FIG. 3 is an exploded perspective view of an outer hub assembly of a spindle motor according to an exemplary embodiment of the present invention. FIG. 4 is a vertical sectional view of the spindle motor shown in FIG. 3. FIG. 5 is a partial sectional view illustrating a state in which the outer hub assembly shown in FIG. 3 is mounted on an off-line servo-track writer.

Referring to FIGS. 3 through 5, a spindle motor 130 for rotating data storage disks 121, 122, and 123 is installed on a base member 110 of a hard disk drive (HDD).

The spindle motor 130 includes a shaft 131, and a stator 133 and a rotator disposed around the shaft 131. The rotator is referred to as a hub. In the spindle motor 130, the rotator has a double hub structure. To be specific, the rotator includes an inner hub 134 fixed to an outer periphery of the shaft 131 and rotating together with the shaft 131, and an outer hub 150 detachably coupled to an outer periphery of the inner hub 134 and rotating together with the shaft 131 and the inner hub 134.

The outer hub 150 and a fastening member 160 (described later) constitute an outer hub assembly 140. The plurality of data storage magnetic disks 121, 122, and 123 and at least one spacer 136 for maintaining an interval between adjacent disks of the plurality of disks 121, 122, and 123 are secured to an outer periphery of the outer hub 150. For example, if the three disks 121, 122, and 123 are secured to the outer periphery of the outer hub 150 as shown in FIGS. 3 and 4, two spacers 136 are used. In addition, two, or four or more disks may be secured to the outer periphery of the outer hub 150. The number of spacers used depends on the number of the disks.

The outer hub 150 can be handled integrally with the plurality of disks 121, 122, and 123 and the spacers 136 secured to the outer periphery thereof. To this end, the plurality of disks 121, 122, and 123 and the spacers 136 must be firmly secured to the outer periphery of the outer hub 150.

The outer hub 150 includes a body unit 152, a support unit 154, and a clamping unit 156. The body unit 152 has a cylindrical shape so that the body unit 152 can be fitted to the outer periphery of the inner hub 134. The support unit 154 is disposed on a bottom portion of the body unit 152 and supports the plurality of disks 121, 122, and 123. The clamping unit 156 is disposed on a top portion of the body unit 152 and clamps the plurality of disks 121, 122, and 123 to the outer hub 150 so as to prevent the disks 121, 122, and 123 from being separated from the outer hub 150.

In the present embodiment, the body unit 152 is divided into two bodies, that is, a lower body 152a and an upper body 152b. The lower body 152a and the upper body 152b are coupled to each other to form the body unit 152. The lower body 152a and the upper body 152b can be coupled in various ways. For example, the lower body 152a and the upper body 152b may be screwed together. To this end, the lower body 152a has a screw portion 153a formed on an outer peripheral surface of a top portion thereof, and the upper body 152b has a screw portion 153b formed on an inner peripheral surface of a bottom portion thereof, so that the screw portions 153a and 153b can mesh with each other.

If the body unit 152 of the outer hub 150 is divided into the lower body 152a and the upper body 152b, the support unit 154 may be integrated with a bottom portion of the lower body 152a in the form of a flange, and the clamping unit 156 may be integrated with a top portion of the upper body 152b in the form of a flange.

After the plurality of disks 121, 122, and 123 and the spacers 136 are assembled to an outer periphery of the lower body 152a, the upper body 152b is screwed to the lower body 152a. Then, the plurality of disks 121, 122, and 123 are firmly fixed between the support unit 154 and the clamping unit 156. Accordingly, the outer hub 150, the plurality of disks 121, 122, and 123, and the spacers 136 can be handled integrally.

The fastening member 160 fixes the outer hub 150 to the inner hub 134. The fastening member 160 is coupled to a top portion of the outer hub 150, specifically, the top portion of the body unit 152. To this end, a groove 157 with a predetermined depth is formed on a top surface of the body unit 152, and the fastening member 160 is inserted into the groove 157. A plurality of projections 164 are formed on an outer peripheral surface of the fastening member 160, and a plurality of slots 158 into which the projections 164 are inserted are formed on an inner peripheral surface of the groove 157. The projections 164, which may be four in number, may be formed at regular intervals along the outer peripheral surface of the fastening member 160. The slots 158, which may be four in number, may be formed along the inner peripheral surface of the groove 157 and correspond to the projections 164.

The fastening member 160 inserted into the groove 157 is fixed to the shaft 131 of the spindle motor 130 using a fastening screw 170. To this end, a perforated central screw insertion hole 162 into which the fastening screw 170 is inserted is formed in the fastening member 160, and a central screw fastening hole 132 with a predetermined depth is formed on a top surface of the shaft 131.

After the outer hub 150 is assembled to the outer periphery of the inner hub 134 of the spindle motor 130 and the fastening member 160 is inserted into the groove 157 formed on the top surface of the outer hub 150, the fastening screw 170 is fastened to the shaft 131 of the spindle motor 130. Then, the outer hub 150 is fixed to both the shaft 131 and the inner hub 134. Accordingly, the outer hub 150 can rotate together with the shaft 131 and the inner hub 134, and thus, the plurality of disks 121, 122, and 123 secured to the outer periphery of the outer hub 150 can rotate.

The outer hub assembly 140 constructed as above can be easily assembled to the spindle motor 130 by tightening the fastening screw 170, and can also be easily separated from the spindle motor 130 by loosening the fastening screw 170. At this time, the outer hub assembly 140, the plurality of disks 121, 122, and 123 and the spacers 136, which are secured to the outer periphery of the outer hub 150, can be handled integrally.

As shown in FIG. 5, the outer hub assembly 140 separated from the spindle motor 130 can be mounted on an off-line servo-track writer 190 using the fastening member 160 and the fastening screw 170. Specifically, a screw fastening hole 194 to which the fastening screw 170 is fastened is formed in an end of a motor shaft 192 of the off-line servo-track writer 190. The motor shaft 192 has substantially the same diameter as the inner hub 134 of the spindle motor 130.

After the outer hub assembly 140 is fitted to an outer periphery of the motor shaft 192, the fastening screw 170 is fastened to the motor shaft 192. Then, the outer hub assembly 140 to which the plurality of disks 121, 122, and 123, and the spacers 136 are secured is fixed to the motor shaft 192, and, accordingly, can rotate together with the motor shaft 192.

The outer hub assembly 140 of the spindle motor 130 can be selectively mounted on the spindle motor 130 or on the off-line servo-track writer 190 in the state in which the plurality of disks 121, 122, and 123, and the spacers 136 are secured to the outer hub assembly 140.

Accordingly, if the outer hub assembly 140 to which the plurality of disks 121, 122, and 123 are secured is prepared and then the outer hub assembly 140 is mounted on the off-line servo-track writer 190, servo-track information can be written on the plurality of disks 121, 122, and 123 simultaneously. The outer hub assembly 140 can be separated from the off-line servo-track writer 190 and then assembled to the spindle motor 130 of the HDD. As a result, misalignment of rotational axes and phases of the disks 121, 122, and 123, which may be caused during a process of assembling the plurality of disks 121, 122, and 123 to the spindle motor 130 after the servo-track writing, can be prevented.

Figure 6A:
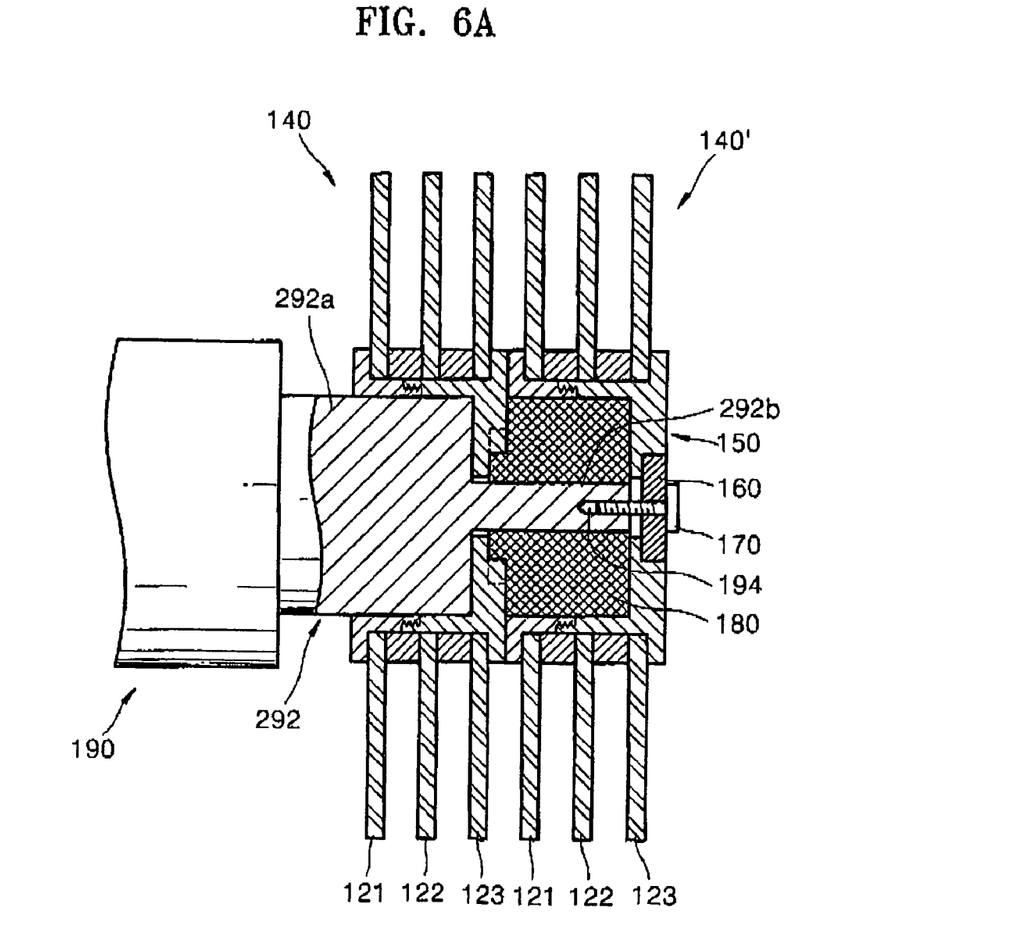
FIG. 6A is a partial sectional view illustrating an example in which a plurality of outer hub assemblies are mounted on an off-line servo-track writer.
Figure 6B:
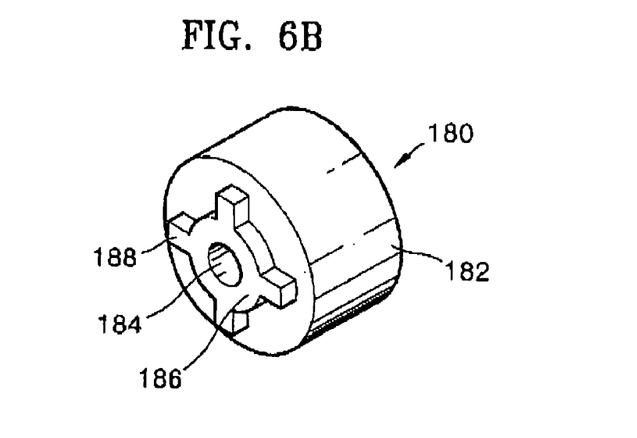
FIG. 6B is a perspective view of a coupling member shown in FIG. 6A.

FIG. 6A is a partial sectional view illustrating an example in which a plurality of outer hub assemblies are mounted on an off-line servo-track writer. FIG. 6B is a perspective view of a coupling member shown in FIG. 6A.

Referring to FIGS. 6A and 6B, a plurality of outer hub assemblies, for example, two outer hub assemblies 140 and 140', may be mounted on a motor shaft 292 of the off-line servo-track writer 190. For example, the two outer hub assemblies 140 and 140' may be mounted as shown, or three or more outer hub assemblies may be mounted. The case where the two outer hub assemblies 140 and 140' are mounted on the motor shaft 292 will be explained below for illustrative purposes.

In this instance, the motor shaft 292 may have a larger diameter portion 292a and a smaller diameter portion 292b. The larger diameter portion 292a of the motor shaft 292 is inserted into the outer hub 150 of the first outer hub assembly 140, and the smaller diameter portion 292b of the motor shaft 292 is inserted into an outer hub 150 of the second outer hub assembly 140'.

A coupling member 180 is interposed between the first and second outer hub assemblies 140 and 140' to couple the two outer hub assemblies 140 and 140'. The coupling member 180, as shown in FIG. 6B, includes a hub insertion unit 182 inserted into the outer hub 150 of the second outer hub assembly 140', and a groove insertion unit 186 formed on a surface of the hub insertion unit 182 to be inserted into the groove 157 formed on the top surface of the outer hub 150 of the first outer hub assembly 140. The hub insertion unit 182 has an outer diameter corresponding to an inner diameter of the outer hub 150, and has a central shaft insertion hole 184 into which the smaller diameter portion 292b of the motor shaft 292 is inserted. The groove insertion unit 186 is formed around the shaft insertion hole 184, and has an outer diameter corresponding to an inner diameter of the groove 157. Projections 188 are formed on an outer peripheral surface of the groove insertion unit 186 to be inserted into the slots 158 formed on the inner peripheral surface of the groove 157. That is, the groove insertion unit 186 has the same shapes as the fastening member 160.

To mount the disks 121, 122, and 123, first, the first outer hub assembly 140 is fitted to an outer periphery of the larger diameter portion 292a of the motor shaft 292. Thereafter, while the coupling member 180 is fitted to an outer periphery of the smaller diameter portion 292b, the groove insertion unit 186 and the projections 188 of the coupling member 180 are inserted into the groove 157 and the slots 158 formed on the top surface of the outer hub 150 of the first outer hub assembly 140, respectively. Next, while the second outer hub assembly 140' is assembled to the outer periphery of the smaller diameter portion 292b of the motor shaft 292, the outer hub 150 of the second outer hub assembly 140' is fitted to an outer periphery of the hub insertion unit 182 of the coupling member 180. Finally, the second outer hub assembly 140' is fixed to the motor shaft 292 using the fastening member 160 and the fastening screw 170.

If three or more outer hub assemblies are mounted on the motor shaft 292 of the off-line servo-track writer 190, after the second outer hub assembly 140' is attached to the outer periphery of the smaller diameter portion 292b as described above, another coupling member 180 is assembled and then a third outer hub assembly is assembled to the motor shaft 292 of the off-line servo-track writer 190.

Figure 7A:
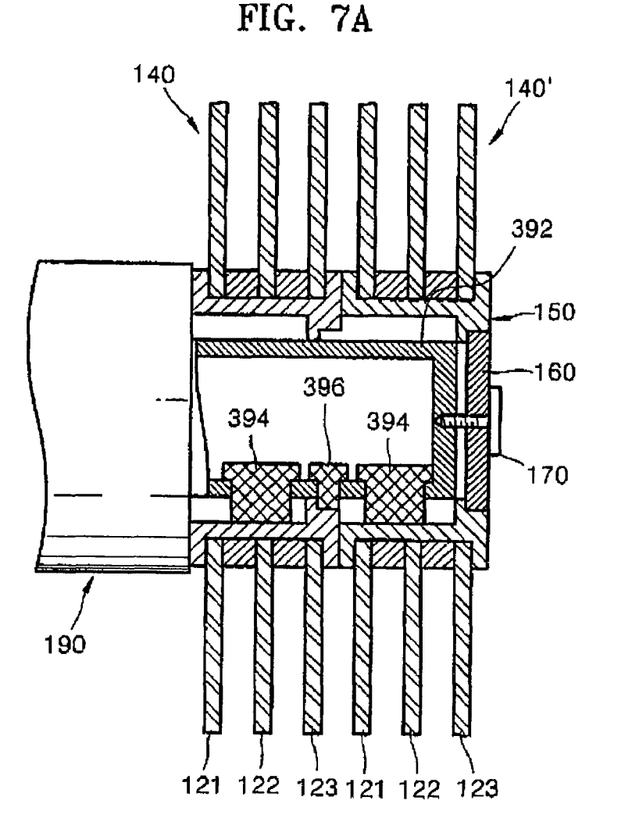
FIG. 7A is a partial sectional view illustrating another example in which a plurality of outer hub assemblies are mounted on an off-line servo-track writer.
Figure 7B:
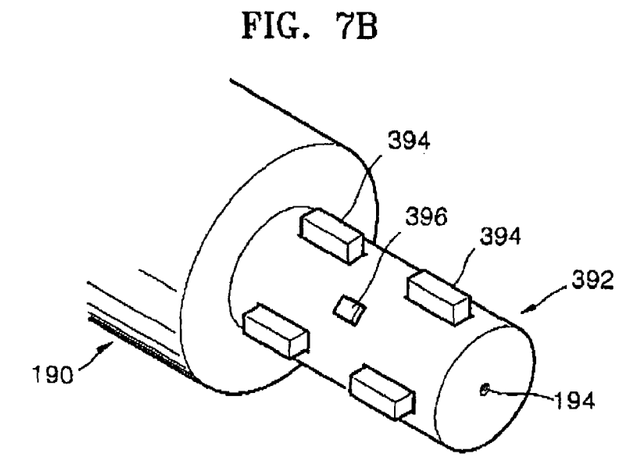
FIG. 7B is a perspective view of a motor shaft shown in FIG. 7A.

FIG. 7A is a partial sectional view illustrating another example in which a plurality of outer hub assemblies are mounted on an off-line servo-track writer. FIG. 7B is a perspective view of a motor shaft shown in FIG. 7A.

Referring to FIGS. 7A and 7B, the off-line servo-track writer 190 includes a cylindrical motor shaft 392 having a predetermined diameter and an inner space. A plurality of pressure members 394 and at least one projection 396 are installed on the motor shaft 392 such that the pressure members 394 can move into and out of the motor shaft 392. Three or four pressure members 394 corresponding to the outer hub assemblies 140 and 140' may be arranged at regular intervals along an outer periphery of the motor shaft 392. The projection 396 is disposed at a position corresponding to at least one of the slots 158 formed on the top surface of the outer hub 150 of the first outer hub assembly 140.

If compressed air is supplied into the motor shaft 392 constructed as above, the pressure members 394 and the projection 396 are outwardly projected from an outer peripheral surface of the motor shaft 392. If the supplied compressed air is cut off, the pressure members 394 and the projection 396 can be pushed into the motor shaft 392.

First, the first outer hub assembly 140 and the second outer hub assembly 140' are sequentially fitted to the outer periphery of the motor shaft 392. Next, if compressed air is supplied into the motor shaft 392, the pressure members 394 and the projection 396 get out of the motor shaft 392. Then, due to pressure, the pressure members 394 contact inner peripheral surfaces of the outer hubs 150 of the first and second outer hub assemblies 140 and 140', respectively. The projection 396 is inserted into one of the slots 158 formed on the top surface of the outer hub 150 of the first outer hub assembly 140. Finally, the second outer hub assembly 140' is fixed to the motor shaft 392 using the fastening member 160 and the fastening screw 170.

Instead of the projection 396, the coupling member 180 illustrated in FIGS. 6A and 6B may be fitted to the outer periphery of the motor shaft 392 to be interposed between the two outer hub assemblies 140 and 140'.

As described above, if the plurality of outer hub assemblies are mounted on the motor shaft of the off-line servo-track writer, servo-track writing can be performed on the plurality of disks simultaneously, thereby reducing a time required for the servo-track writing.

Figure 8:
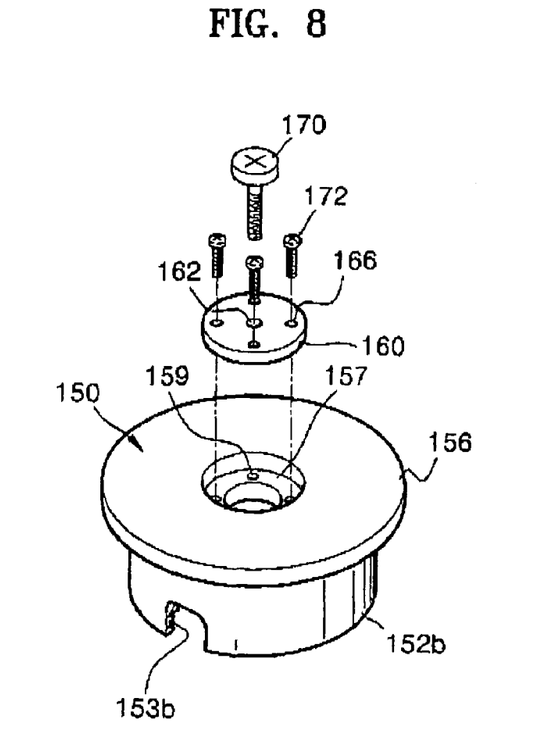
FIG. 8 is a partial perspective view illustrating a modified example of the outer hub assembly shown in FIG. 3.

FIG. 8 is a partial perspective view of a modified example of the outer hub assembly shown in FIG. 3.

Referring to FIG. 8, the fastening member 160 can be coupled to the outer hub 150 using a plurality of coupling screws 172 instead of the projections 164 and the slots 158 shown in FIG. 3. To this end, a plurality of screw fastening holes 159 to which the coupling screws 172 are fastened are formed inside the groove 157 formed on the top surface of the outer hub 150, and a plurality of screw insertion holes 166 into which the coupling screws 172 are inserted are formed on the fastening member 160.

Figure 9:
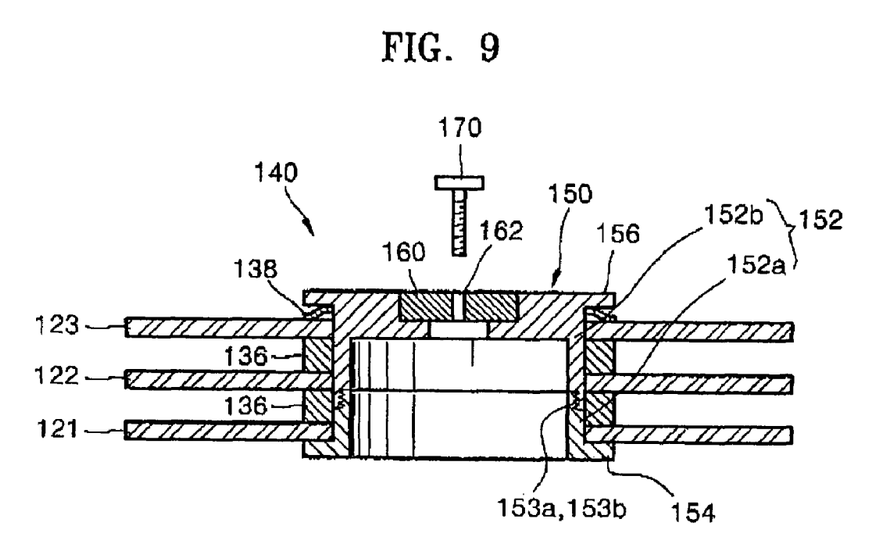
FIG. 9 is a sectional view illustrating another modified example of the outer hub assembly shown in FIG. 3.

FIG. 9 is a sectional view illustrating a second modified example of the outer hub assembly shown in FIG. 3.

Referring to FIG. 9, a clamping washer 138 may be interposed between the clamping unit 156 of the outer hub 150 and the uppermost disk 123 of the plurality of disks 121, 122, and 123. The clamping washer 138 may be made of ring-shaped elastic metal that applies a predetermined elastic force to the plurality of disks 121, 122, and 123.

Accordingly, the plurality of disks 121, 122, and 123 can be more firmly fixed and an external shock applied to the disks 121, 122, and 123 can be partially absorbed by the clamping washer 138.

In the modified examples of the outer hub assembly illustrated in FIGS. 8 and 9, one or a plurality of outer hub assemblies may be mounted on the off-line servo-track writer 190 shown in FIGS. 5, 6A and 7A.

Outer hub assemblies according to other exemplary embodiments of the present invention will now be explained with reference to FIGS. 10 through 13.

Figure 10:
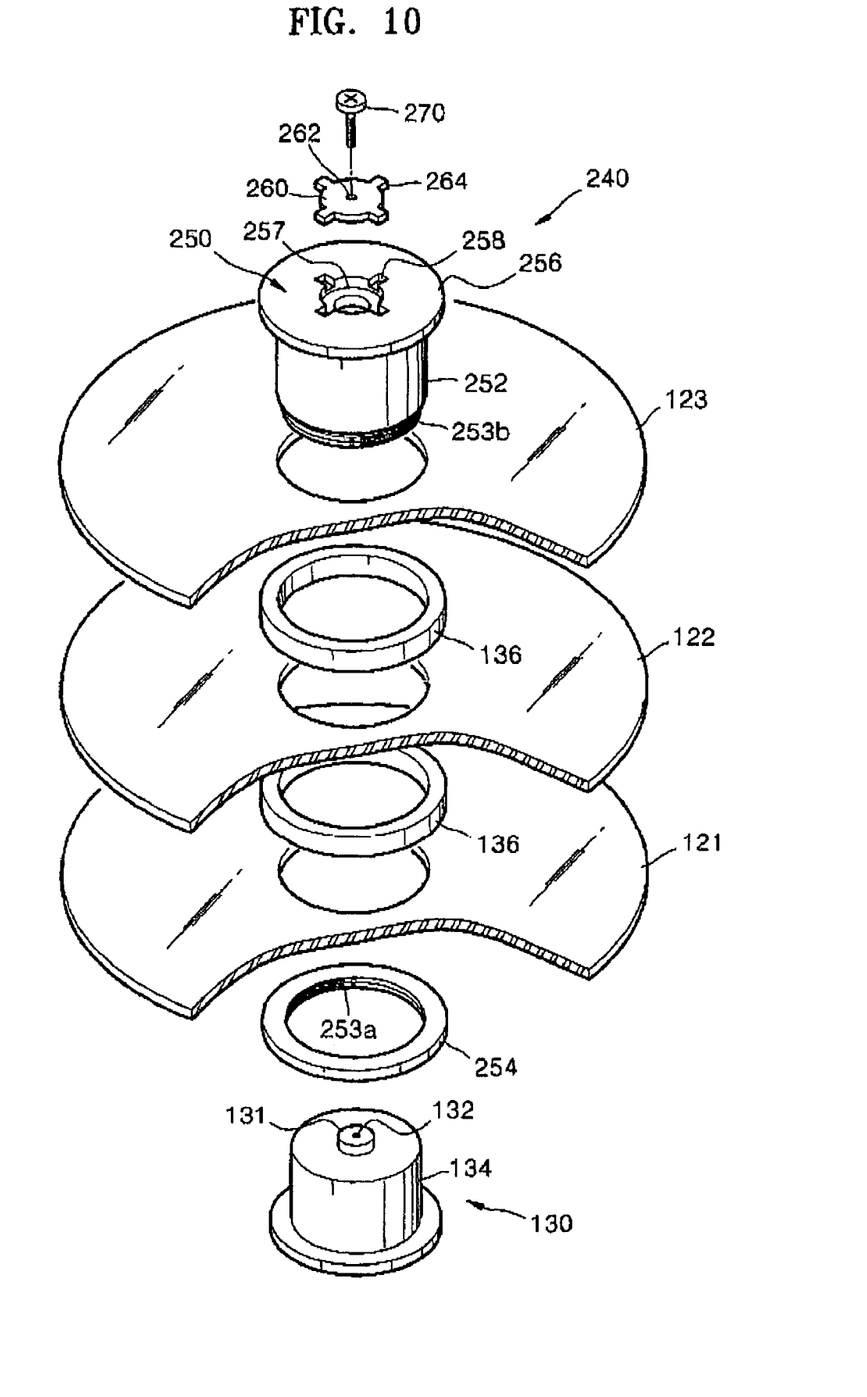
FIG. 10 is an exploded perspective view of an outer hub assembly of a spindle motor according to another exemplary embodiment of the present invention.

FIG. 10 is an exploded perspective view of an outer hub assembly 240 of the spindle motor 130 according to another exemplary embodiment of the present invention.

Referring to FIG. 10, the outer hub assembly 240 of the present embodiment is identical to the outer hub assemblies of the previous embodiments except in an outer hub 250. The outer hub assembly 240 includes the outer hub 250 detachably coupled to the outer periphery of the inner hub 134 of the spindle motor 130, and a fastening member 260 coupled to a top portion of the outer hub 250 and fixing the outer hub 250 to the inner hub 134.

The outer hub 250 includes a cylindrical body unit 252 fitted to the outer periphery of the inner hub 134, a support unit 254 disposed on a bottom portion of the body unit 252 and supporting the plurality of disks 121, 122, and 123, and a clamping unit 256 disposed on a top portion of the body unit 252 and clamping the plurality of disks 121, 122, and 123. In the present embodiment, the clamping unit 256 may be integrally formed with the top portion of the body unit 252 in the form of a flange, and the support unit 254 may be a separate ring-shaped member coupled to the bottom portion of the body unit 252. To this end, the support unit 254 has a screw portion 253a formed on an inner peripheral surface thereof, and the body unit 252 has a screw portion 253b formed on the bottom portion thereof, so that the screw portions 253a and 253b can mesh with each other.

After the plurality of disks 121, 122, and 123 and the spacers 136 are secured to an outer periphery of the body unit 252, the ring-shaped support unit 254 is screwed to the bottom portion of the body unit 252. Then, the plurality of disks 121, 122, and 123 are firmly fixed between the support unit 254 and the clamping unit 256 such that the outer hub 250, the plurality of disks 121, 122, and 123, and the spacers 136 can be handled integrally.

The fastening member 260 is inserted into a groove 257 formed on a top surface of the body unit 250, and projections 264 formed on an outer peripheral surface of the fastening member 260 are inserted into slots 258 formed on an inner peripheral surface of the groove 257. A central screw insertion hole 262 is formed on the fastening member 260, and a fastening screw 270 is inserted into the screw insertion hole 262 and fastened to the screw fastening hole 132 formed on the top surface of the shaft 131 of the spindle motor 130. In this way, the outer hub assembly 240 can be fixed to the inner hub 134 of the spindle motor 130.

One or a plurality of outer hub assemblies 240 constructed as above may be mounted on the off-line servo-track writer 190 as shown in FIGS. 5, 6A, and 7A. Mounting in such a way can have the same effects as in the previous embodiments.

Furthermore, the modified examples illustrated in FIGS. 8 and 9 can be applied to the outer hub assembly 240 illustrated in FIG. 10.

Figure 11:
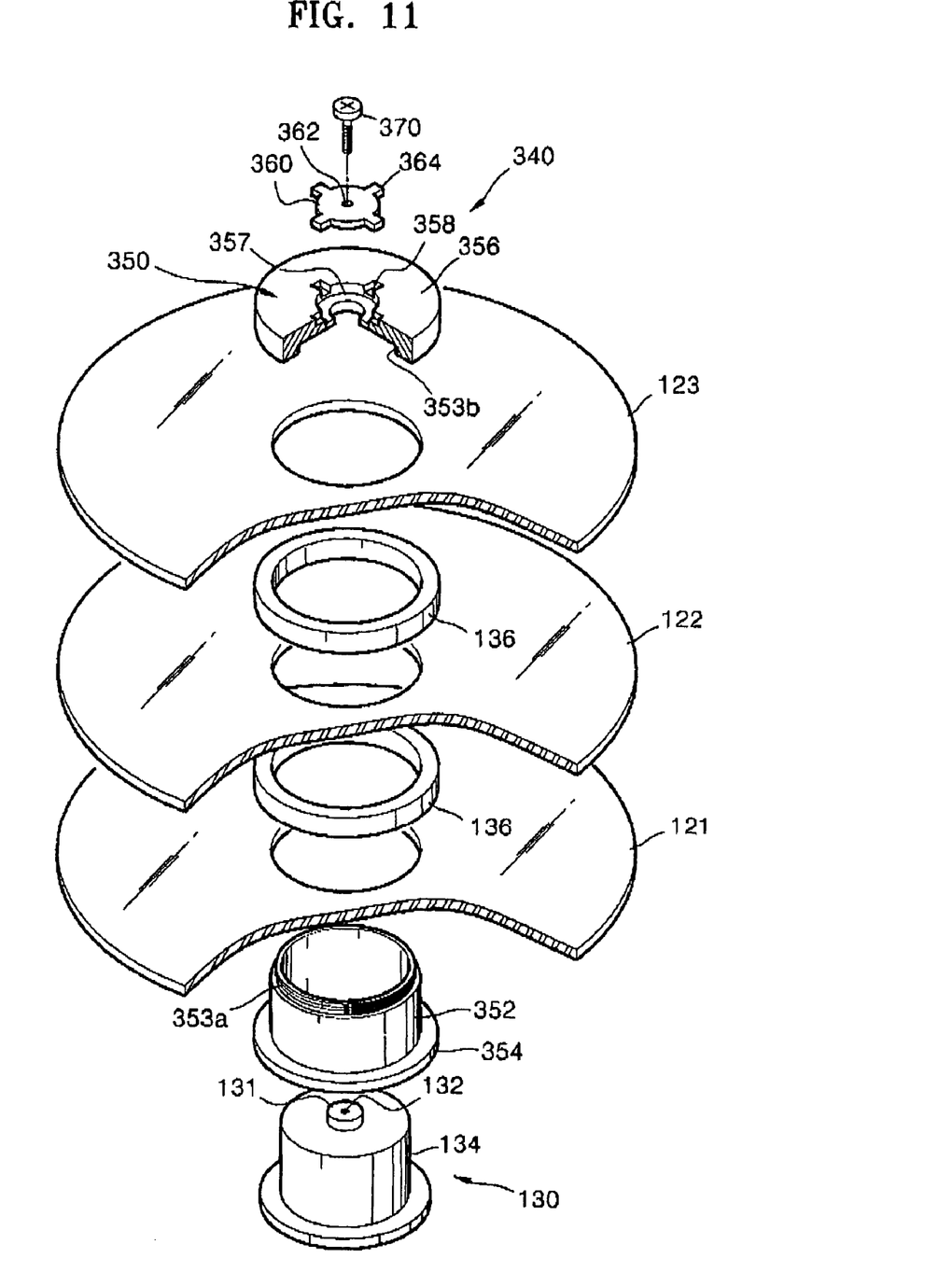
FIG. 11 is an exploded perspective view of an outer hub assembly of a spindle motor according to still another exemplary embodiment of the present invention.

FIG. 11 is an exploded perspective view of an outer hub assembly 340 of the spindle motor 130 according to still another exemplary embodiment of the present invention.

Referring to FIG. 11, the outer hub assembly 340 of the present embodiment is identical to the outer hub assemblies of the previous embodiments, except in an outer hub 350. The outer hub assembly 340 includes the outer hub 350 detachably coupled to the outer periphery of the inner hub 134 of the spindle motor 130, and a fastening member 360 coupled to a top portion of the outer hub 350 and fixing the outer hub 350 to the inner hub 134.

The outer hub 350 includes a cylindrical body unit 352 fitted to the outer periphery of the inner hub 134, a support unit 354 disposed on a bottom portion of the body unit 352 and supporting the plurality of disks 121, 122, and 123, and a ring-shaped clamping unit 356 disposed on a top portion of the body unit 352 and clamping the plurality of disks 121, 122, and 123. In the present embodiment, the support unit 354 may be integrated with the bottom portion of the body unit 352 in the form of a flange and the clamping unit 356 may be a separate ring-shaped member coupled to the top portion of the body unit 352. To this end, the clamping unit 356 has a screw portion 353b formed on an inner peripheral surface thereof, and the body unit 352 has a screw portion 353a formed on the top portion thereof, so that the screw portions 353a and 353b can mesh with each other.

After the plurality of disks 121, 122, and 123 and the spacers 136 are secured to an outer periphery of the body unit 352, the ring-shaped clamping unit 356 is screwed to the top portion of the body unit 352. Then, since the plurality of disks 121, 122, and 123 are firmly fixed between the support unit 354 and the clamping unit 356, the outer hub 350, the plurality of disks 121, 122, and 123, and the spacers 136 can be handled integrally.

The fastening member 360 is inserted into a groove 357 formed on a top surface of the outer hub 350, specifically, a top surface of the clamping unit 356, and at this time, projections 364 formed on an outer peripheral surface of the fastening member 360 are inserted into slots 358 formed on an inner peripheral surface of the groove 357. A central screw insertion hole 362 is formed on the fastening member 360, and a fastening screw 370 is inserted into the screw insertion hole 362 and fastened to the screw fastening hole 132 formed on the top surface of the shaft 131 of the spindle motor 130. In this way, the outer hub assembly 340 can be fixed to the inner hub 134 of the spindle motor 130.

One or a plurality of outer hub assemblies 340 constructed as above may be mounted on the off-line servo-track writer 190 as shown in FIGS. 5, 6A, and 7A. Mounting in such a way can have the same effects as in the previous embodiments.

Furthermore, the modified examples illustrated in FIGS. 8 and 9 can be applied to the outer hub assembly 340 shown in FIG. 11.

Figure 12:
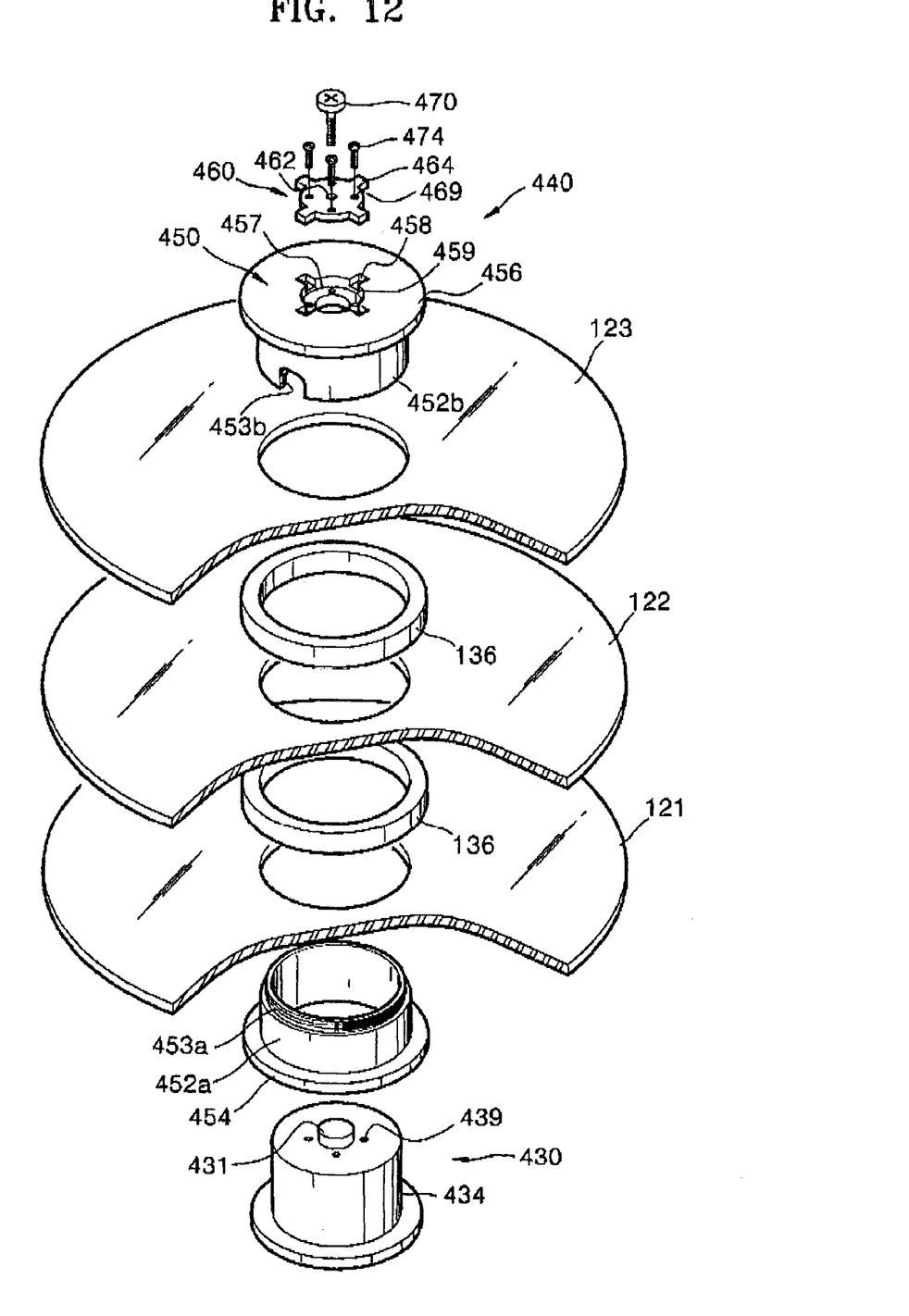
FIG. 12 is an exploded perspective view of an outer hub assembly of a spindle motor according to yet another exemplary embodiment of the present invention.
Figure 13:
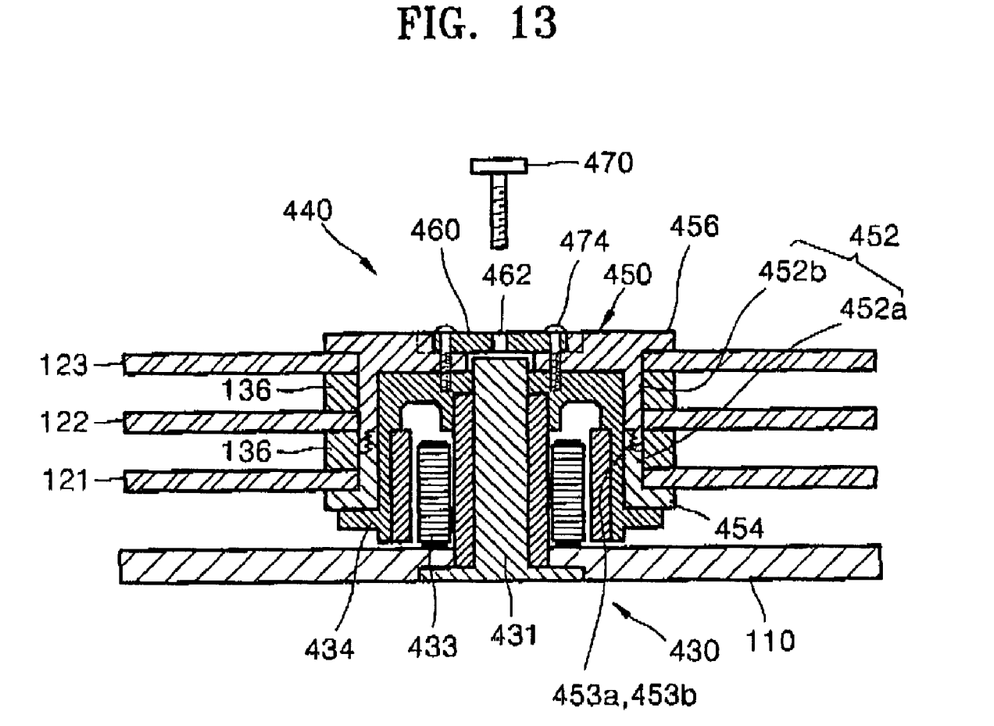
FIG. 13 is a vertical sectional view of the spindle motor shown in FIG. 12.

FIG. 12 is an exploded perspective view of an outer hub assembly of a spindle motor 430 according to yet another exemplary embodiment of the present invention. FIG. 13 is a vertical sectional view of a spindle motor shown in FIG. 12.

Referring to FIGS. 12 and 13, a spindle motor for a HDD according to the present invention may have various structures. Although the shaft 131 is rotatably installed in the spindle motor 130 of the previous embodiments, the spindle motor 430 of the present embodiment has a shaft 431 fixed to the base member 110. A stator 433 and a rotator are disposed around the shaft 431. The rotator has a double hub structure as in the previous embodiments. To be specific, the rotator includes an inner hub 434 rotatably coupled to an outer periphery of the fixed shaft 431, and an outer hub 450 detachably coupled to an outer periphery of the inner hub 434 to rotate together with the inner hub 434.

The outer hub 450 and a fastening member 460 constitute an outer hub assembly 440. The outer hub 450 includes a cylindrical body unit 452 fitted to the outer periphery of the inner hub 434, a support unit 454 disposed on a bottom portion of the body unit 452 and supporting the plurality of disks 121, 122, and 123, and a clamping unit 456 disposed on a top portion of the body unit 452 and clamping the plurality of disks 121, 122, and 123. The body unit 452 is divided into two bodies, that is, a lower body 452a and an upper body 452b. The lower body 452a has a screw portion 453a formed on an outer peripheral surface of a top portion thereof, and the upper body 452b has a screw portion 453b formed on an inner peripheral surface of a bottom portion thereof, such that the screw portions 453a and 453b can mesh with each other. The support unit 454 may be integrated with a bottom portion of the lower body 452a in the form of a flange, and the clamping unit 456 may be integrated with a top portion of the upper body 452b in the form of a flange.

The fastening member 460 is coupled to a top portion of the outer hub 450 and fixes the outer hub 450 to the inner hub 134. A groove 457 into which the fastening member 460 is inserted is formed on a top surface of the outer hub 450, specifically, a top surface of the body unit 452. Projections 464 are formed on an outer peripheral surface of the fastening member 460, and slots 458 into which the projections 464 are inserted are formed on an inner peripheral surface of the groove 457.

Further, a plurality of screw insertion holes 459 into which a plurality of fixing screws 474 for fixing the fastening member 460 and the outer hub 450 to an inner hub 434 are inserted are formed inside the groove 457. A central screw insertion hole 462 into which a fastening screw 470 is inserted is formed in the fastening member 460, and a plurality of screw insertion holes 469 into which the fixing screws 474 are inserted are formed around the screw insertion hole 462. A plurality of screw fastening holes 439 to which the fixing screws 474 are fastened are formed in a top surface of the inner hub 434. However, since the fastening screw 470 is not fastened to the shaft 431 of the spindle motor 430, a screw fastening hole does not need to be formed on the shaft 431.

After the outer hub 450 is secured to the outer periphery of the inner hub 434 of the spindle motor 430 and the fastening member 460 is inserted into the groove 457 formed on the top surface of the outer hub 450, the fixing screws 474 are fastened to the inner hub 434 of the spindle motor 430. Then, the outer hub 450 is fixed to the inner hub 434. Accordingly, the outer hub 450 can rotate together with the inner hub 434, and accordingly, the plurality of disks 121, 122, and 123 secured to an outer periphery of the outer hub 450 can rotate together with the inner hub 434.

In this way, the outer hub assembly 440 is assembled to the spindle motor 430 using the plurality of fixing screws 474, not the fastening screw 470. The fastening screw 470 is used to mount the outer hub assembly 440 on the motor shaft 192, 292, or 392 of the off-line servo-track writer 190 as shown in FIGS. 5, 6A, and 7A. That is, after the outer hub assembly 440 is fitted to the outer periphery of the motor shaft 192, 292, or 392, the fastening screw 470 is fastened to the screw fastening hole 194 formed on the end surface of the motor shaft 192, 292, or 392. At this time, the fixing screws 474 may not be used.

Furthermore, depending on the structure and strength of the outer hub assembly 440 attached to the motor shaft 192, 292, or 392 of the off-line servo-track writer 190, the outer hub assembly 440 may be fixed to the motor shaft 192, 292, or 392 of the servo-track writer 190 using only the fixing screws 474 or both the fastening screw 470 and the fixing screws 474.

The outer hub assembly 440 constructed as above can have the same effects as in the previous embodiments.

Further, the modified examples illustrated in FIGS. 8 and 9 and the outer hubs illustrated in FIGS. 10 and 11 can be applied to the outer hub assembly 440 shown in FIGS. 12 and 13.

As described above, since the outer hub of the spindle motor to which the plurality of disks are secured can be mounted on the servo-track writer, servo-track writing can be performed on the plurality of disks simultaneously. Further, after the servo-track writing is completed, the outer hub to which the plurality of disks are secured can be secured to the spindle motor of the HDD. Consequently, misalignment of the rotational axes and phases of the disks, which may be caused during the process of assembling the plurality of disks to the spindle motor after the servo-track writing, can be prevented.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A hub assembly comprising:
   an outer hub;
   a fastening member coupled to a top portion of the outer hub; and
   an inner hub or a motor shaft;
   wherein said outer hub is detachably coupled to an outer periphery of the inner hub or to an outer periphery of the motor shaft, the outer hub is shaped such that a plurality of disks and at least one spacer for maintaining an interval between adjacent disks among the plurality of disks are fitted to an outer periphery of the outer hub;
   wherein said fastening member fixes the outer hub to the inner hub or the motor shaft;
   wherein the outer hub comprises a cylindrical body unit, a support unit disposed on a bottom portion of the body unit and supporting the plurality of disks, and a clamping unit disposed on a top portion of the body unit and clamping the plurality of disks; and
   wherein the body unit comprises an upper body and a lower body, the clamping unit is integrated with a top portion of the upper body in the form of a flange, and the support unit is integrated with a bottom portion of the lower body in the form of a flange;
   wherein the clamping unit and the top portion of the upper body are parts of a first single-piece unit, and the support unit and the bottom portion of the lower body are parts of a second single-piece unit.

2. The hub assembly of claim 1, wherein the inner hub is the inner hub of a spindle motor in a hard disk drive and the motor shaft is the motor shaft of an off-line servo-track writer.

3. The hub assembly of claim 2, wherein the fastening member is fixed to the inner hub or the motor shaft using a fastening screw that is fastened to a shaft of the spindle motor or to the motor shaft of the off-line servo-track writer.

4. The hub assembly of claim 2, wherein the fastening member is fixed to the inner hub using a plurality of fixing screws that are fastened to the inner hub of the spindle motor, or fixed to the motor shaft using a fastening screw that is fastened to the motor shaft of the off-line servo-track writer.

5. The hub assembly of claim 2, wherein a plurality of outer hub assemblies are mounted on the motor shaft of the off-line servo-track writer.

6. The hub assembly of claim 5, wherein the motor shaft comprises a larger diameter portion and a smaller diameter portion, the larger diameter portion is inserted into an outer hub of one of the plurality of outer hub assemblies, and the smaller diameter portion is inserted into an outer hub of at least another one of the plurality of outer hub assemblies.

7. The hub assembly of claim 6, wherein a coupling member is interposed between adjacent outer hub assemblies of the plurality of outer hub assemblies, and the coupling member is fitted to an outer periphery of the smaller diameter portion of the motor shaft.

8. The hub assembly of claim 7, wherein the coupling member comprises a hub insertion unit inserted into an outer hub of one of the plurality of outer hub assemblies, and a groove insertion unit formed on one surface of the hub insertion unit to be inserted into a groove formed on a top surface of an outer hub of another one of the plurality of outer hub assemblies.

9. The hub assembly of claim 5, further comprising a plurality of pressure members installed on the motor shaft to correspond to the plurality of outer hub assemblies such that the plurality of pressure members can get into and out of the motor shaft,
   wherein the motor shaft has a cylindrical shape with a predetermined diameter.

10. The hub assembly of claim 9, wherein the plurality of pressure members are projected outwardly from an outer peripheral surface of the motor shaft and forced onto inner peripheral surfaces of the outer hub assemblies by pressure.

11. The hub assembly of claim 9, further comprising at least one projection installed on the motor shaft so that the projection can get into and out of the motor shaft,
    wherein the at least one projection is inserted into a slot formed on a top surface of an outer hub of a corresponding outer hub assembly.

12. The hub assembly of claim 9, wherein a coupling member is interposed between adjacent outer hub assemblies of the plurality of outer hub assemblies and fitted to the outer periphery of the motor shaft.

13. The hub assembly of claim 1, wherein a bottom portion of the upper body and a top portion of the lower body have screw portions such that the screw portions can mesh with each other.

14. The hub assembly of claim 1, wherein the clamping unit is integrated with the top portion of the body unit in the form of a flange, and the support unit is a separate ring-shaped member coupled to the bottom portion of the body unit.

15. The hub assembly of claim 14, wherein an inner surface of the support unit and the bottom portion of the body unit have screw portions such that the screw portions can mesh with each other.

16. The hub assembly of claim 1, wherein the clamping unit is a separate ring-shaped member coupled to the top portion of the body unit, and the support unit is integrated with a bottom portion of the support unit in the form of a flange.

17. The hub assembly of claim 16, wherein an inner surface of the clamping unit and the top portion of the body unit have screw portions such that the screw portions can mesh with each other.

18. The hub assembly of claim 1, wherein a clamping washer is interposed between the clamping unit and an uppermost disk among the plurality of disks to apply an elastic force to the plurality of disks.

19. The hub assembly of claim 1, wherein a groove into which the fastening member is inserted is formed on a top surface of the outer hub, at least one projection is formed on an outer peripheral surface of the fastening member, and at least one slot into which the projection is inserted is formed on an inner peripheral surface of the groove.

20. The hub assembly of claim 1, wherein a groove into which the fastening member is inserted is formed on a top surface of the outer hub, and the fastening member inserted into the groove is screwed to the outer hub using a plurality of coupling screws.

21. The hub assembly of claim 1, wherein the first and the second single piece units are each of a unitary construction.

22. A spindle motor, which rotates a plurality of data storage disks in a hard disk drive, the spindle motor comprising:
    a shaft;
    an inner hub rotatably installed on an outer periphery of the shaft; and
    a hub assembly comprising: an outer hub detachably coupled to an outer periphery of the inner hub, the outer hub shaped such that the plurality of disks and at least one spacer for maintaining an interval between adjacent disks of the plurality of disks can be secured to an outer periphery of the outer hub; and a fastening member coupled to a top portion of the outer hub and fixing the outer hub to the inner hub, wherein the hub assembly can be separated from the spindle motor to be mounted on an off-line servo-track writer;

wherein the outer hub comprises a cylindrical body unit, a support unit disposed on a bottom portion of the body unit and supporting the plurality of disks, and a clamping unit disposed on a top portion of the body unit and clamping the plurality of disks;

wherein the body unit comprises an upper body and a lower body, the clamping unit is integrated with a top portion of the upper body in the form of a flange, and the support unit is integrated with a bottom portion of the lower body;

wherein the clamping unit and the top portion of the upper body are parts of a first single-piece unit, and the support unit and the bottom portion of the lower body are parts of a second single-piece unit.

23. The spindle motor of claim 22, wherein a bottom portion of the upper body and a top portion of the lower body have screw portions such that the screw portions can mesh with each other.

24. The spindle motor of claim 22, wherein the clamping unit is integrated with the top portion of the body unit in the form of a flange, and the support unit is a separate ring-shaped member coupled to the bottom portion of the body unit.

25. The spindle motor of claim 22, wherein an inner peripheral surface of the support unit and the bottom portion of the body unit have screw portions such that the screw portions can mesh with each other.

26. The spindle motor of claim 22, wherein the clamping unit is a separate ring-shaped member coupled to the top portion of the body unit, and the support unit is integrated with the bottom portion of the body unit in the form of a flange.

27. The spindle motor of claim 26, wherein an inner peripheral surface of the clamping unit and the top portion of the body unit have screw portions such that the screw portions can mesh with each other.

28. The spindle motor of claim 22, wherein a clamping washer is interposed between the clamping unit and an uppermost disk of the plurality of disks to apply an elastic force to the plurality of disks.

29. The spindle motor of claim 22, wherein a groove into which the fastening member is inserted is formed on a top surface of the outer hub, at least one projection is formed on an outer peripheral surface of the fastening member, and at least one slot into which the projection is inserted is formed on an inner peripheral surface of the groove.

30. The spindle motor of claim 22, wherein a groove into which the fastening member is inserted is formed on a top surface of the outer hub, and the fastening member inserted into the groove is screwed to the outer hub using a plurality of coupling screws.

31. The spindle motor of claim 22, wherein the fastening member is fixed to the inner hub using a fastening screw that is fastened to the shaft of the spindle motor.

32. The spindle motor of claim 22, wherein the fastening member is fixed to the inner hub using a plurality of fixing screws that are fastened to the inner hub of the spindle motor.

* * * * *